US012205783B2

(12) United States Patent
Zhu

(10) Patent No.: US 12,205,783 B2
(45) Date of Patent: Jan. 21, 2025

(54) APPARATUS FOR OPENING OR CLOSING A DC CIRCUIT, AND METHOD FOR AUTOMATICALLY CLOSING A DC CIRCUIT

(71) Applicant: Siemens Aktiengesellschaft, Munich (DE)

(72) Inventor: Yi Zhu, Kuemmersbruck (DE)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 17/599,055

(22) PCT Filed: Sep. 13, 2019

(86) PCT No.: PCT/EP2019/074539
§ 371 (c)(1),
(2) Date: Sep. 28, 2021

(87) PCT Pub. No.: WO2020/200492
PCT Pub. Date: Oct. 8, 2020

(65) Prior Publication Data
US 2022/0020544 A1    Jan. 20, 2022

(30) Foreign Application Priority Data

Mar. 29, 2019    (WO) ................ PCT/CN2019/080553
Mar. 29, 2019    (WO) ................ PCT/CN2019/080554
Mar. 29, 2019    (WO) ................ PCT/CN2019/080558

(51) Int. Cl.
*H02H 7/00*          (2006.01)
*H01H 9/54*          (2006.01)
(Continued)

(52) U.S. Cl.
CPC .......... *H01H 33/596* (2013.01); *H01H 9/542* (2013.01); *H02H 1/0007* (2013.01);
(Continued)

(58) Field of Classification Search
None
See application file for complete search history.

(56) References Cited

U.S. PATENT DOCUMENTS 5,654,859 A    8/1997  Shi
8,803,358 B2 *  8/2014  Hafner ................ H02H 7/268
                                                363/51
(Continued)

FOREIGN PATENT DOCUMENTS

CA        2910979 A1    1/2015
CN      101741057 A    6/2010
(Continued)

OTHER PUBLICATIONS

PCT International Search Report and Written Opinion of International Searching Authority dated Dec. 10, 2019 in PCT International Application No. PCT/EP2019/074539 filed Sep. 13, 2019.
(Continued)

*Primary Examiner* — Stephen W Jackson
(74) *Attorney, Agent, or Firm* — Harness, Dickey & Pierce, P.L.C.

(57) ABSTRACT

A device is for opening or closing a DC circuit with at least one busbar. The device includes an electric switch for opening or closing the DC circuit; a fault current detector; a trigger unit and a precharging device. The electric switch opens the DC circuit via the trigger unit upon a fault current being detected by the fault current detector. Further, the precharging device restores the voltage on the busbar prior to closing the electric switch. The device further includes a control unit for automatically closing the electric switch after the pre-charging process.

20 Claims, 4 Drawing Sheets

(51) Int. Cl.
  *H01H 33/59* (2006.01)
  *H02H 1/00* (2006.01)
  *H02H 3/087* (2006.01)
  *H02H 7/125* (2006.01)
  *H02H 7/22* (2006.01)
  *H02H 7/26* (2006.01)
  *H02H 9/00* (2006.01)
  *H02J 1/10* (2006.01)
  *H02J 1/12* (2006.01)

(52) U.S. Cl.
  CPC .......... *H02H 3/087* (2013.01); *H02H 7/1252* (2013.01); *H02H 7/1257* (2013.01); *H02H 7/222* (2013.01); *H02H 7/268* (2013.01); *H02H 9/001* (2013.01); *H02J 1/10* (2013.01); *H02J 1/12* (2013.01); *H01H 2009/544* (2013.01)

(56) References Cited

U.S. PATENT DOCUMENTS

| Patent/Pub. No. | Date | Name |
|---|---|---|
| 9,042,146 B2 | 5/2015 | Weiss et al. |
| 9,184,003 B2 | 11/2015 | Crane |
| 9,525,284 B2 | 12/2016 | Kim et al. |
| 9,698,589 B1 | 7/2017 | Leyh |
| 9,755,433 B2 | 9/2017 | Xu et al. |
| 9,853,536 B2 | 12/2017 | Xu et al. |
| 10,693,293 B2 | 6/2020 | Qi et al. |
| 10,944,254 B2 | 3/2021 | Shi et al. |
| 2004/0027734 A1 | 2/2004 | Fairfax et al. |
| 2005/0052798 A1 | 3/2005 | Grisoni |
| 2007/0014062 A1 | 1/2007 | Fischer |
| 2007/0077830 A1 | 4/2007 | Rzadki et al. |
| 2010/0118450 A1 | 5/2010 | Ritzinger et al. |
| 2010/0231042 A1 | 9/2010 | Weale |
| 2010/0292853 A1 | 11/2010 | McDonnell |
| 2011/0127853 A1 | 6/2011 | Fujita et al. |
| 2011/0298283 A1 | 12/2011 | Sannino et al. |
| 2012/0218676 A1 | 8/2012 | Demetriades et al. |
| 2013/0021708 A1 | 1/2013 | Demetriades et al. |
| 2013/0106184 A1 | 5/2013 | Hafner et al. |
| 2013/0121051 A1* | 5/2013 | Weiss .................. H02P 6/28 363/131 |
| 2013/0270902 A1 | 10/2013 | Andersen et al. |
| 2013/0307444 A1 | 11/2013 | Settemsdal |
| 2013/0314828 A1 | 11/2013 | Chen et al. |
| 2014/0063669 A1 | 3/2014 | Lundqvist |
| 2014/0078622 A1 | 3/2014 | Crane |
| 2014/0254050 A1 | 9/2014 | Haines et al. |
| 2014/0361621 A1 | 12/2014 | Lindtjorn |
| 2015/0014277 A1 | 1/2015 | Theisen et al. |
| 2015/0137595 A1 | 5/2015 | Xu et al. |
| 2016/0152151 A1* | 6/2016 | Yang .................. B60L 58/27 320/109 |
| 2016/0172838 A1 | 6/2016 | Luebke et al. |
| 2016/0190791 A1 | 6/2016 | Sim |
| 2016/0336734 A1 | 11/2016 | Lee et al. |
| 2017/0054291 A1 | 2/2017 | Qi et al. |
| 2017/0098931 A1 | 4/2017 | Gerdinand et al. |
| 2017/0170663 A1 | 6/2017 | Christ et al. |
| 2017/0373498 A1 | 12/2017 | Haugan et al. |
| 2018/0034258 A1 | 2/2018 | Schweitzer, III et al. |
| 2018/0159315 A1 | 6/2018 | Aagesen et al. |
| 2018/0240627 A1* | 8/2018 | Matsuo .................. H02H 3/087 |
| 2018/0241200 A1 | 8/2018 | Hu et al. |
| 2019/0020193 A1 | 1/2019 | Cao et al. |
| 2019/0190258 A1 | 6/2019 | Shi et al. |
| 2019/0267842 A1 | 8/2019 | Richter |
| 2019/0334340 A1* | 10/2019 | Niehoff .................. H01H 33/596 |
| 2019/0353689 A1 | 11/2019 | Hauer |
| 2020/0119548 A1 | 4/2020 | Haugan |
| 2021/0339692 A1 | 11/2021 | Miro Bargallo et al. |
| 2021/0359632 A1* | 11/2021 | Valasek .................. H02M 7/125 |
| 2022/0020544 A1 | 1/2022 | Zhu |
| 2022/0166214 A1 | 5/2022 | Batra et al. |
| 2022/0172914 A1 | 6/2022 | Batra et al. |

FOREIGN PATENT DOCUMENTS

| | | |
|---|---|---|
| CN | 202305715 U | 7/2012 |
| CN | 102696087 A | 9/2012 |
| CN | 102959818 A | 3/2013 |
| CN | 103457246 A | 12/2013 |
| CN | 203352192 U | 12/2013 |
| CN | 103762546 A | 4/2014 |
| CN | 104242229 A | 12/2014 |
| CN | 104518564 A | 4/2015 |
| CN | 104617573 A | 5/2015 |
| CN | 104638618 A | 5/2015 |
| CN | 105162093 A | 12/2015 |
| CN | 105207178 A | 12/2015 |
| CN | 105305372 A | 2/2016 |
| CN | 105322514 A | 2/2016 |
| CN | 105529677 A | 4/2016 |
| CN | 105743058 A | 7/2016 |
| CN | 105762775 A | 7/2016 |
| CN | 106099878 A | 11/2016 |
| CN | 106253243 A | 12/2016 |
| CN | 106486965 A | 3/2017 |
| CN | 106663557 A | 5/2017 |
| CN | 106786403 A | 5/2017 |
| CN | 206442309 U | 8/2017 |
| CN | 107210603 A | 9/2017 |
| CN | 107276045 A | 10/2017 |
| CN | 107565524 A | 1/2018 |
| CN | 107768195 A | 3/2018 |
| CN | 107810583 A | 3/2018 |
| CN | 108092253 A | 5/2018 |
| CN | 108152633 A | 6/2018 |
| CN | 108448548 A | 8/2018 |
| CN | 109193661 A | 1/2019 |
| CN | 109494693 A | 3/2019 |
| CN | 109494695 A | 3/2019 |
| EP | 2523331 A1 | 11/2012 |
| EP | 2634885 A1 | 9/2013 |
| EP | 3109964 A1 | 12/2016 |
| EP | 3379674 A1 | 9/2018 |
| EP | 3477809 A1 | 5/2019 |
| KR | 20160035845 A | 4/2016 |
| WO | WO-2005049418 A2 | 6/2005 |
| WO | WO-2012/123015 A1 | 9/2012 |
| WO | WO-2013/131782 A1 | 9/2013 |
| WO | WO-2018/028247 A1 | 2/2018 |
| WO | WO-2018/109161 A1 | 6/2018 |

OTHER PUBLICATIONS

ABB Substation Automation Products and Systems, "REF 541, 543, 545 Protection, Monitoring and Control Technical Reference Manual Part 1, General," 1 MRS750527-MUM, Sep. 29, 1997.
PCT International Search Report and Written Opinion of International Searching Authority dated Dec. 10, 2019 in PCT International Application No. PCT/EP2019/074545 filed Sep. 13, 2019.
PCT International Search Report and Written Opinion of International Searching Authority dated Dec. 10, 2019 in PCT International Application No. PCT/EP2019/074541 filed Sep. 13, 2019.
PCT International Search Report and Written Opinion of International Searching Authority dated Dec. 6, 2019 in PCT International Application No. PCT/EP2019/074542 filed Sep. 13, 2019.
PCT International Search Report and Written Opinion of International Searching Authority dated Dec. 9, 2019 in PCT International Application No. PCT/EP2019/074544 filed Sep. 13, 2019.
U.S. Appl. No. 17/599,067, filed Sep. 28, 2021.
U.S. Appl. No. 17/599,103, filed Sep. 28, 2021.
U.S. Appl. No. 17/599,076, filed Sep. 28, 2021.
U.S. Appl. No. 17/599,119, filed Sep. 28, 2021.

(56) References Cited

OTHER PUBLICATIONS

Lin Wenfu:; "Electrical Operation of Power Units"; pp. 356-358; China Water & Power Press, Mar. 2007.

* cited by examiner

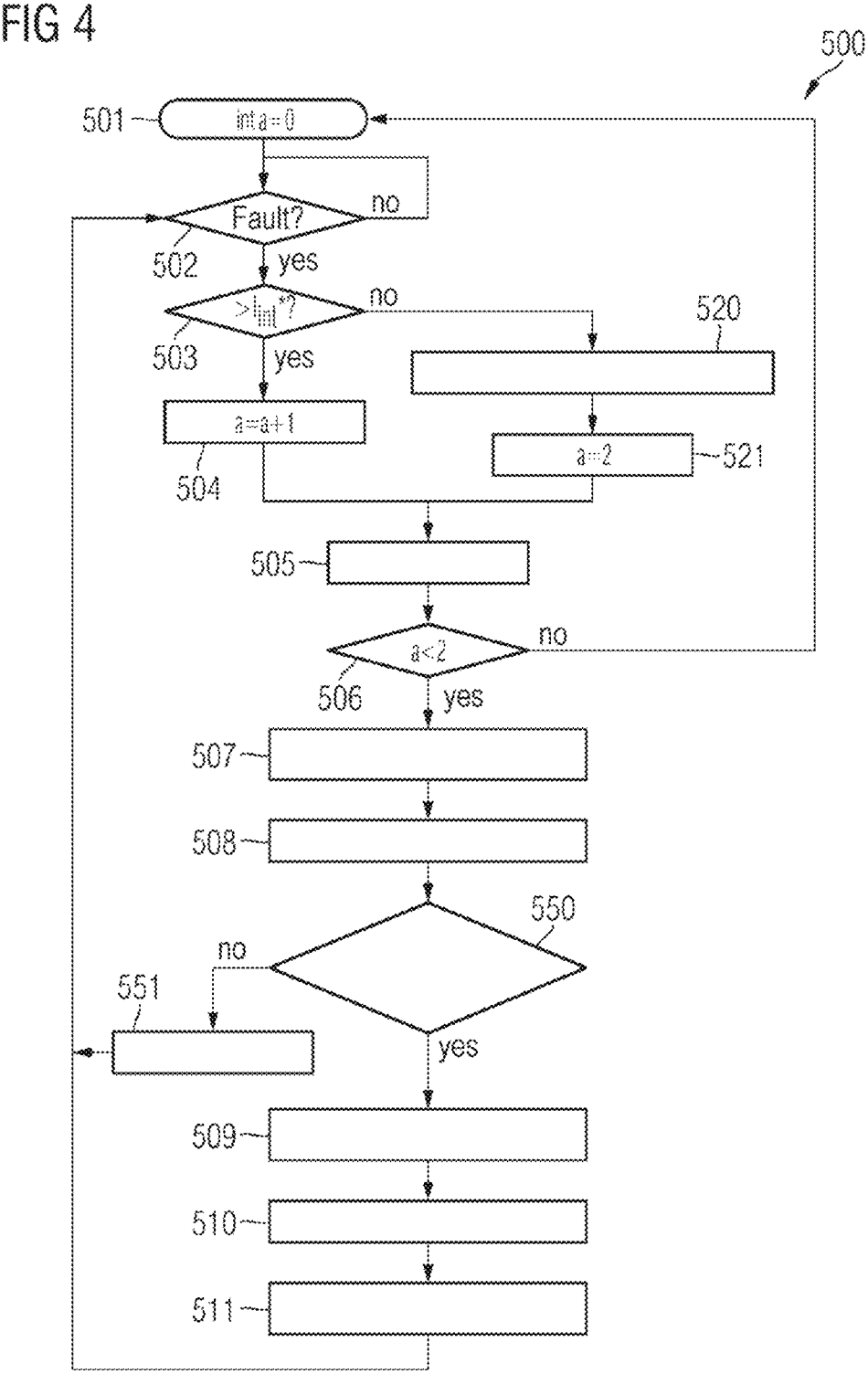

APPARATUS FOR OPENING OR CLOSING A DC CIRCUIT, AND METHOD FOR AUTOMATICALLY CLOSING A DC CIRCUIT

PRIORITY STATEMENT

This application is the national phase under 35 U.S.C. § 371 of PCT International Application No. PCT/EP2019/074539 which has an International filing date of Sep. 13, 2019, and which claims priority to PCT International Application No. PCT/CN2019/080553 filed Mar. 29, 2019, PCT International Application No. PCT/CN2019/080554 filed Mar. 29, 2019, and PCT International Application No. PCT/CN2019/080558 filed Mar. 29, 2019, the entire contents of each of which are incorporated herein by reference.

FIELD

Embodiments of the present application generally relate to an apparatus for opening or closing a DC circuit and to a method for automatically closing a DC circuit.

BACKGROUND

DC distribution systems are considered to be promising with regard to the saving of energy and their efficient use. Particularly in the case of renewable energy sources or feeds, it may be easier to integrate them in a DC distribution system than in an AC system. For example, in the case of a photovoltaic system, the DC-AC/DC converter can be replaced with a simple DC/DC converter. Batteries or capacitor banks may likewise be directly connected to such a system as energy stores without additional converters.

If active front end (AFE) technology is used for feeding at AC sources or if braking energy is recovered from motors, energy can be returned: whereas the AC side of the network is stabilized in the case of active front end (AFE) apparatuses and the network quality is therefore compensated overall with a reactive energy supply, the braking energy of motors can be supplied to the distribution system.

However, DC networks also have challenges with respect to the protection from short circuits or other fault sources. In an example DC network corresponding to the illustration in FIG. 1 having feed-in device(s) 1010; 1011; 1012; 1013 and loads 1050; 1051; 1052; 1053; 1054 and an interposed distribution network 2000 having conventional mechanical protective apparatuses (for example molded case circuit breaker, MCCB), they lose their selectivity on account of the fast self-protection functions of the power electronics in the converters. In the illustration in FIG. 1, the feed-in device(s) 1010; 1011, for example, may be AC sources which are fed into the system via active front ends (AFE) 1020; 1021.

Freewheeling diodes cannot be sufficiently protected by the self-protection of the converters and fuses on the AC side since there may be serious damage caused by electrical current on account of a possible voltage reversal in the event of LRC oscillations in the fault path. This is observed, in particular, if the active front end (AFE) is not connected to the busbar in a short-circuit-proof manner. The diodes may likewise act as uncontrolled rectifiers after the IGBTs have been switched off. In this case, the fault current is supplied from the AC side and may possibly not be switched off quickly enough by the fuses and may therefore destroy the diodes.

The discharging of a capacitor bank or DC links during a serious fault scenario generates extremely high current peaks which flow in a period of ms (milliseconds). Conventional mechanical switches are not fast enough to switch off such a fault current. The smallest load path in such a system having a plurality of feed-in devices then has the highest ratio of maximum short-circuit current to the nominal current.

The main problems of a DC distribution system are the possible destruction of freewheeling diodes on account of a voltage reversal, the capacitive discharge and the selectivity with respect to the active front ends (AFE).

SUMMARY

In a protection concept which uses SSCBs (solid state circuit breaker, semiconductor switch) as protective devices, they can be used to disconnect fault regions within 10 μs (microseconds). The inventors have discovered that a problem with the pure use of semiconductor switches is that they have a considerably higher power loss and are additionally more cost-intensive than conventional switches. On account of the low currents of the self-protection functions of the semiconductor components of the converters and their extremely fast response, it is very challenging to achieve selectivity with respect to the semiconductor switches.

Embodiments of the invention provide a new apparatus for opening or closing a DC circuit and a method for automatically closing a DC circuit which improves upon or even overcomes at least one of the disadvantages mentioned.

At least one embodiment, according to the invention, is directed to an apparatus for opening or closing a DC circuit. Advantageous configurations of the apparatus are specified in the claims. At least one embodiment, according to the invention, is directed to an electrical network. At least one embodiment, according to the invention, is directed to a method for automatically closing a DC circuit. Advantageous configurations of the method according to the invention are specified in claims.

The apparatus for opening or closing a DC circuit having at least one busbar of at least one embodiment comprises:
  an electrical switch for opening or closing the DC circuit,
  a fault current detection device,
  a tripping unit,
  a pre-charging apparatus,
  wherein, if a fault current is detected by the fault current detection device, the electrical switch opens the DC circuit via the tripping unit and the pre-charging apparatus restores the voltage on the busbar before the electrical switch is closed, wherein the apparatus comprises a control unit for automatically closing the electrical switch after pre-charging.

The method for automatically closing a DC circuit via an apparatus according to at least one embodiment of the invention comprises:
  setting a counter to zero;
  determining whether there is a fault via the fault current detection device and, if there is no fault, further determining whether there is a fault, otherwise:
  incrementing the counter by one if the fault current exceeds a current threshold and otherwise passing through a time-delaying tripping characteristic and setting the counter to two;
  opening the electrical switch;
  jumping to setting the counter to zero if the counter is greater than or equal to two, otherwise:
  waiting to activate the pre-charging apparatus;
  activating the pre-charging apparatus;

if the voltage on the busbar does not rise: deactivating the pre-charging apparatus and jumping to the step of determining whether there is a fault;

otherwise:

waiting to close the electrical switch;

closing the electrical switch;

activating the control unit for the switch-on transient; and jumping to the step of determining whether there is a fault.

BRIEF DESCRIPTION OF THE DRAWINGS

The above-described properties, features and advantages of this invention and the manner in which they are achieved become clearer and more distinctly comprehensible in connection with the following description of the embodiments which are explained in more detail in connection with the figures, in which:

FIG. 4: shows a method according to an embodiment of the invention for automatically closing a DC circuit.

DETAILED DESCRIPTION OF THE EXAMPLE EMBODIMENTS

Figure 1:
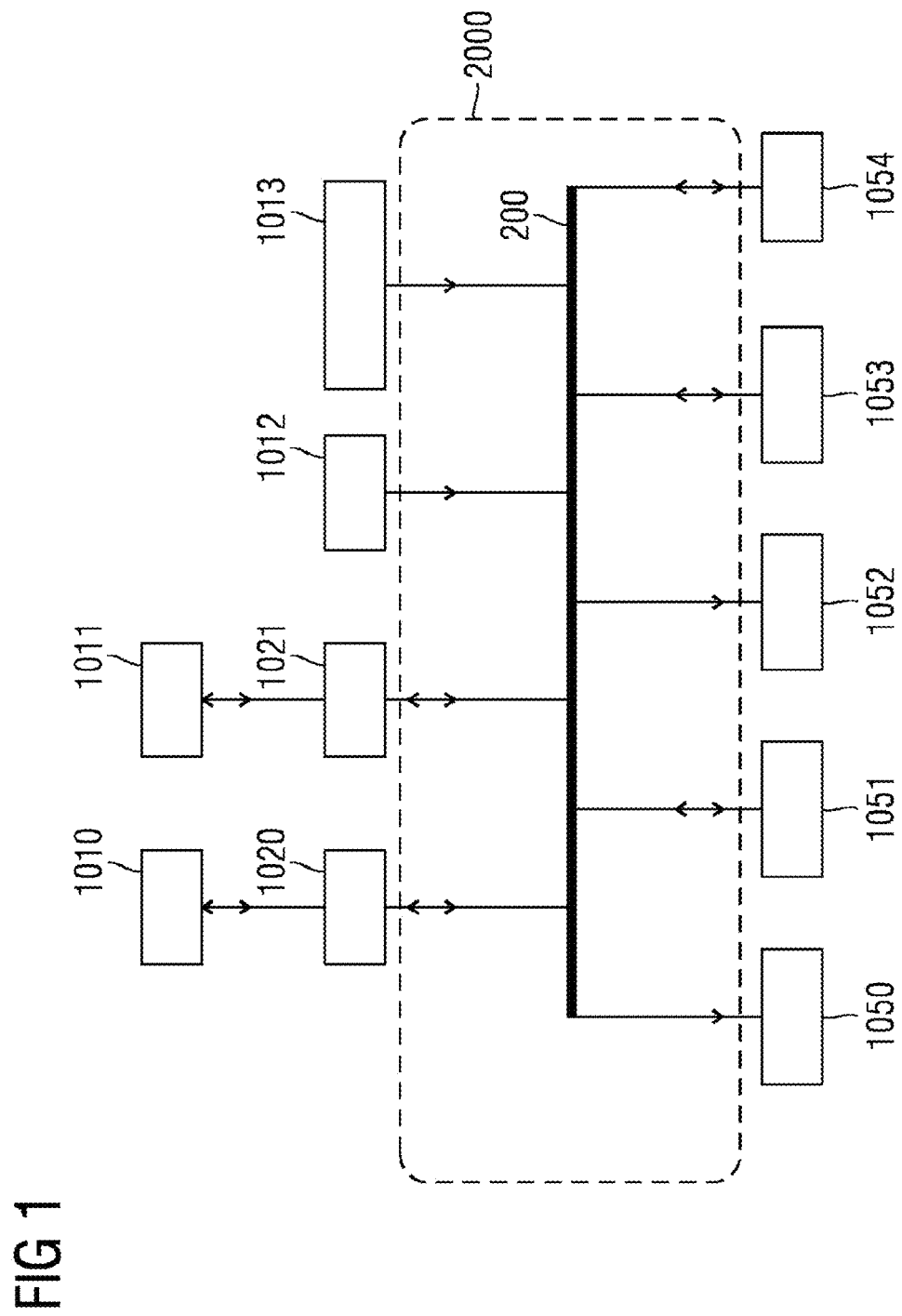
FIG. 1: shows a conventional DC network.

The apparatus for opening or closing a DC circuit having at least one busbar of at least one embodiment comprises:

an electrical switch for opening or closing the DC circuit, a fault current detection device, a tripping unit, a pre-charging apparatus, wherein, if a fault current is detected by the fault current detection device, the electrical switch opens the DC circuit via the tripping unit and the pre-charging apparatus restores the voltage on the busbar before the electrical switch is closed, wherein the apparatus comprises a control unit for automatically closing the electrical switch after pre-charging.

An advantage of the apparatus according to at least one embodiment of the invention is that discharging of the capacitors in a DC circuit is prevented in the event of a fault. Peak currents are significantly reduced. The apparatus according to at least one embodiment of the invention allows faults to be isolated via conventional electrical switches within ms (milliseconds) instead of in the range of μs (microseconds). The use of the apparatus according to at least one embodiment of the invention may likewise be restricted to feed-in device(s) having large capacitances. The possibility of the apparatus according to at least one embodiment of the invention closing automatically allows feed-in device(s) to be able to be automatically included in the DC network again after the fault has been isolated. After the fault has been eliminated, only the protective devices remain switched off and open, which protective devices are arranged close to the location of the fault. Selectivity between the protective devices and the power converters is therefore achieved.

In one configuration, the electrical switch is a semiconductor switch.

In a further configuration, the apparatus according to at least one embodiment of the invention comprises a communication unit.

In a further configuration, the apparatus comprises a control unit for a switch-on transient. This control unit can suppress the switch-on transient.

In a further configuration, the apparatus also comprises a measurement unit for measuring current and/or voltage values.

In a further configuration, the pre-charging apparatus restores the voltage on the busbar after a first waiting time. Alternatively, the pre-charging apparatus restores the voltage on the busbar after receiving a command. The pre-charging apparatus can receive this command via the communication unit.

In a further configuration, the control unit for automatically closing the electrical switch automatically closes the switch after a second waiting time. Alternatively, the control unit for automatically closing the electrical switch closes the switch after restoring a voltage on the busbar above a threshold value.

If the voltage on the busbar does not rise after a predefined time, which indicates a fault which still exists, the pre-charging apparatus receives a deactivation command and the pre-charging operation is interrupted. The pre-charging apparatus waits for the next activation command.

At least one embodiment is directed to an electrical network, wherein the electrical network is provided with feed-in device(s), loads and a distribution network having a busbar, wherein the feed-in device(s) are connected to the loads via the distribution network and the latter comprises the apparatuses according to at least one embodiment of the invention.

The method for automatically closing a DC circuit via an apparatus according to at least one embodiment of the invention comprises:

setting a counter to zero;

determining whether there is a fault via the fault current detection device and, if there is no fault, further determining whether there is a fault, otherwise:

incrementing the counter by one if the fault current exceeds a current threshold and otherwise passing through a time-delaying tripping characteristic and setting the counter to two;

opening the electrical switch;

jumping to setting the counter to zero if the counter is greater than or equal to two, otherwise:

waiting to activate the pre-charging apparatus;

activating the pre-charging apparatus;

if the voltage on the busbar does not rise: deactivating the pre-charging apparatus and jumping to the step of determining whether there is a fault;

otherwise:

waiting to close the electrical switch;

closing the electrical switch;

activating the control unit for the switch-on transient; and jumping to the step of determining whether there is a fault.

In one configuration, the process of waiting to activate the pre-charging apparatus comprises a predefined period of time or is terminated by a command from the communication unit.

In a further configuration of the method according to at least one embodiment of the invention, the process of waiting to close the electrical switch comprises a fixed period of time or is terminated when a predefined voltage is reached on the busbar.

FIG. 1 illustrates a conventional electrical DC network. This network comprises feed-in device(s) 1010; 1011; 1012;

1013, loads 1050; 1051; 1052; 1053; 1054 and a distribution network 2000 having a busbar 200. The feed-in device(s) 1010; 1011 may be, for example, AC sources which are bidirectionally coupled to the distribution network 2000 via active front ends (AFE) 1020; 1021. Feed-in device(s) 1012 may be a photovoltaic system, for example, and feed-in device(s) 1013 may be another source having a power converter. The load 1050 may be, for example, a resistive load, at which current can flow only in a unidirectional manner. Load 1051 may be, for example, a motor with feedback of the braking energy, which enables a bidirectional flow of current. The same applies to load 1053, for example, if the latter is a capacitor bank as an energy store, or to load 1054 if the latter is a battery. Load 1052 may be, for example, a motor without energy feedback and this would again enable a unidirectional flow of current.

Figure 2:
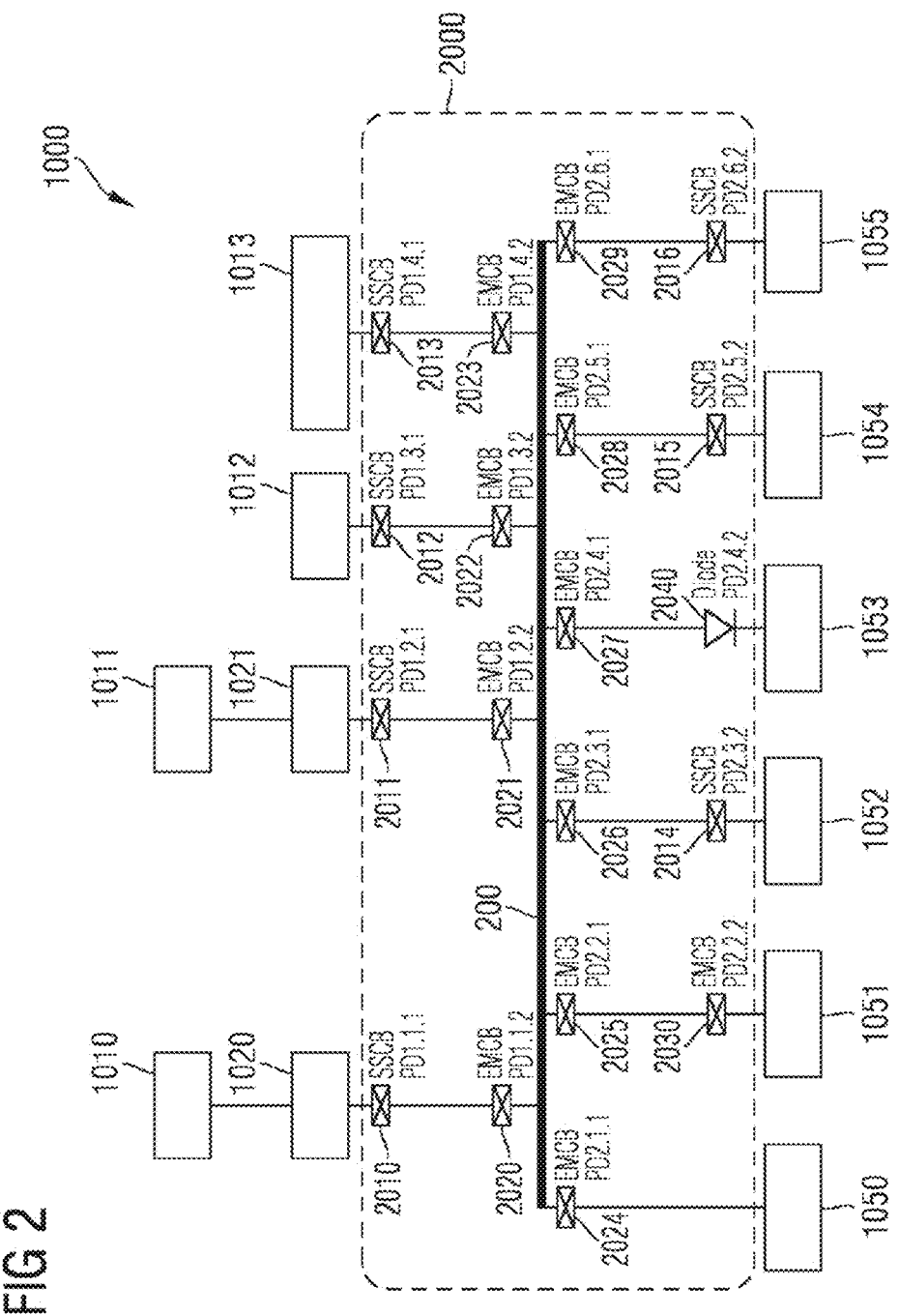
FIG. 2: shows an electrical network according to an embodiment of the invention.

FIG. 2 illustrates the electrical network 1000 according to an embodiment of the invention which again comprises feed-in devices 1010; 1011; 1012; 1013, possibly with active front ends (AFE) 1020; 1021, loads 1050; 1051; 1052; 1053; 1054; 1055 and a distribution network 2000 which is arranged in between and has a busbar 200. In this electrical network 1000 according to the invention, the apparatuses 2010; 2011; 2012; 2013 according to an embodiment of the invention are arranged at the feed-in device(s) and at the loads 1052; 1054; 1055, which can enable a bidirectional flow of current.

Figure 3:
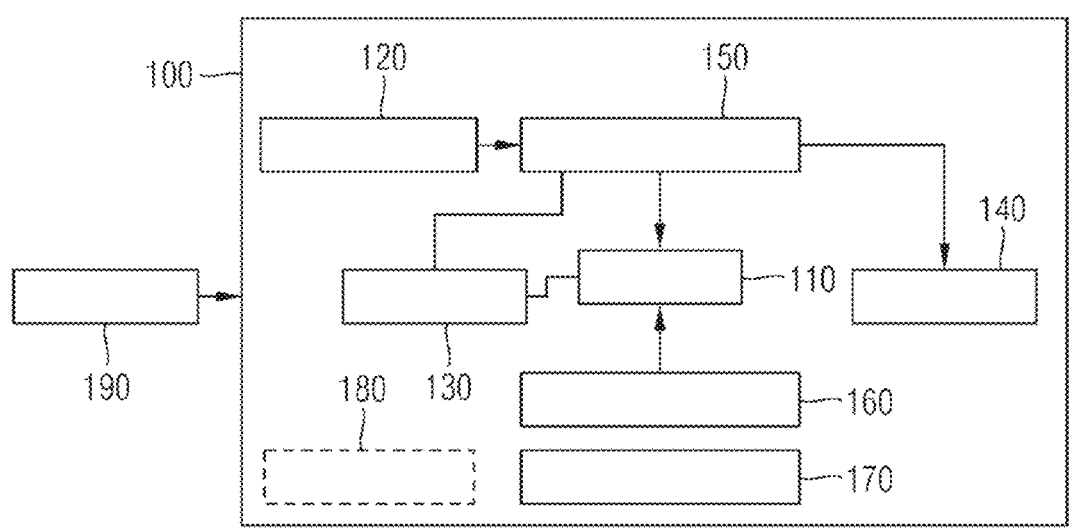
FIG. 3: shows an apparatus according to an embodiment of the invention for opening or closing a DC circuit.

FIG. 3 illustrates the apparatus 100 according to an embodiment of the invention for opening or closing a DC circuit having at least one busbar 200. The apparatus 100 comprises an electrical switch 110 for opening or closing the DC circuit, a fault current detection device 120, a tripping unit 130 and a pre-charging apparatus 140, wherein, if a fault current is detected by the fault current detection device 120, the electrical switch 110 opens the DC circuit via the tripping unit 130, and wherein the pre-charging apparatus 140 restores the voltage on the busbar 200 before the electrical switch 110 is closed. For the purpose of automatic closing, a control unit 150 is also provided in the apparatus 100 according to an embodiment of the invention and can automatically close the electrical switch 110 after pre-charging.

The electrical switch 110 of the apparatus 100 according to an embodiment of the invention may be a semiconductor switch, for example. For example, it may be a semiconductor switch based on silicon (Si), silicon carbide (SiC) or gallium nitride (GaN).

As illustrated in FIG. 3, the apparatus 100 according to an embodiment of the invention may also comprise a communication unit 180. This communication unit 180 can receive commands from a superordinate control unit and/or can coordinate apparatuses 100 arranged in a distribution network 2000.

The apparatus 100 according to an embodiment of the invention may also comprise a control unit 160 for a switch-on transient. For example, the control unit 160 can suppress the switch-on transient.

The apparatus 100 according to an embodiment of the invention may also comprise a measurement unit 170 for measuring current and/or voltage values.

The pre-charging apparatus 140 may restore the voltage on the busbar 200 after a first waiting time. Alternatively, the pre-charging apparatus 140 restores the voltage on the busbar 200 after receiving a command. The activation and deactivation commands can be passed to the pre-charging apparatus 140 via the communication unit 180.

In the apparatus 100 according to an embodiment of the invention, the pre-charging apparatus 140 can receive a deactivation command via the communication unit 180 if the voltage on the busbar 200 does not rise, which indicates a fault which still exists.

The control unit 150 for automatically closing the electrical switch 110 can automatically close the switch after a second waiting time. The control unit 150 for automatically closing the electrical switch 110 may likewise close the switch after restoring a voltage on the busbar 200 above a threshold value. For this purpose, the control unit 150 for automatically closing an electrical switch 110 may receive the voltage values on the busbar 200 from the measurement unit 170.

The different components of the apparatus 100 according to an embodiment of the invention are supplied with electrical energy via the power supply 190. The power supply 190 may be external or internal.

FIG. 4 shows a method 500 according to an embodiment of the invention for automatically closing a DC circuit via an apparatus 100; 2010; 2011; 2012; 2013; 2014; 2015; 2016. For this purpose, the method 500 according to an embodiment of the invention comprises the following steps of:
setting 501 a counter to zero;
determining 502 whether there is a fault via the fault current detection device 120 and, if there is no fault, further determining 502 whether there is a fault, otherwise:
incrementing 504 the counter to one if the fault current exceeds a current threshold and otherwise passing through 520 a time-delaying tripping characteristic and setting 521 the counter to two;
opening 505 the electrical switch 110;
jumping to setting 501 the counter to zero if the counter is greater than or equal to two, otherwise:
waiting 507 to activate 508 the pre-charging apparatus 140;
activating 508 the pre-charging apparatus 140;
if the voltage on the busbar 200 does not rise: deactivating 550 the pre-charging apparatus 140 and jumping to the step of determining 502 whether there is a fault; otherwise:
waiting 509 to close 510 the electrical switch;
closing 510 the electrical switch 110;
activating 511 the control unit 160 for the switch-on transient; and
jumping to the step of determining 502 whether there is a fault.

Step 550 checks whether or not the voltage on the busbar 200 rises. If this is not the case, the pre-charging apparatus 140 is deactivated and the method 500 according to an embodiment of the invention jumps to the step of determining 502 whether there is a fault. Otherwise, that is to say if the voltage on the busbar 200 rises, the method 500 continues with the process of waiting 509 to close 510 the electrical switch.

In the step of waiting 507 to activate 508 the pre-charging apparatus 140, the method 500 according to the invention can wait for a predefined period of time or the process of waiting 507 can be terminated by a command from the communication unit 180.

Furthermore, in the method 500 according to an embodiment of the invention, the process of waiting 509 to close 510 the electrical switch may wait for a fixed period of time or the process of waiting 509 may be terminated when a predefined voltage is reached on the busbar 200.

The fault current detection device 120 should be able to very quickly detect a fault current within a few μs (microseconds). It is therefore possible to react very quickly to a fault via the tripping unit 130 and the electrical switch 110 can be opened within several μs (microseconds) if the current is above a defined threshold. The possibility of automatically closing the electrical switch 110 can be controlled using a firmly defined waiting time and/or using the command from the communication unit 180. The pre-charging apparatus 140 restores the voltage on the busbar 200. The unit 160 may suppress the switch-on transient.

The invention claimed is:

1. An apparatus for opening or closing a DC circuit including at least one busbar, the apparatus comprising:
    an electrical switch to open or close the DC circuit;
    a fault current detection device to detect existence of a fault current;
    a tripping unit;
    a pre-charging apparatus,
        wherein, upon the fault current being detected by the fault current detection device, the electrical switch is configured to open the DC circuit via the tripping unit and the pre-charging apparatus is configured to restore voltage on the at least one busbar before the electrical switch is closed;
    a control unit to automatically close the electrical switch after the restoration of the voltage on the at least one busbar; and
    a second control unit to suppress a switch-on transient.
2. The apparatus of claim 1, wherein the electrical switch is a semiconductor switch.
3. The apparatus of claim 1, further comprising:
    a communication unit.
4. The apparatus of claim 1, further comprising:
    a measurement unit to measure at least one of current and voltage values.
5. The apparatus of claim 1, wherein the pre-charging apparatus is configured to restore the voltage on the busbar after expiration of a first waiting time period.
6. The apparatus of claim 3, wherein the pre-charging apparatus is configured to restore the voltage on the busbar after receiving a command.
7. The apparatus of claim 6, wherein the pre-charging apparatus is configured to receive the command via the communication unit.
8. The apparatus of claim 1, wherein the control unit to automatically close the electrical switch is configured to automatically close the switch after a second waiting time.
9. The apparatus of claim 1, wherein the control unit to automatically close the electrical switch is configured to close the switch after restoration of a voltage on the busbar above a threshold value.
10. The apparatus of claim 3, wherein the pre-charging apparatus is configured to receive a deactivation command via the communication unit upon the voltage on the busbar not rising, indicating a fault which still exists.
11. An electrical network comprising:
    feed-in devices;
    loads; and
    a distribution network including a busbar, wherein the feed-in devices are connected to the loads via the distribution network, the distribution network including a plurality of apparatuses as claimed in claim 1.
12. A method for automatically closing a DC circuit via an apparatus, the method comprising:
    setting a counter to zero;
    determining existence of a fault current and, upon no fault current being determined, continue monitoring for a fault by at least
        incrementing the counter by one upon the fault current exceeding a current threshold and otherwise passing through a time-delaying tripping characteristic and setting the counter to two;
    opening the electrical switch;
    jumping to the setting of the counter to zero upon the counter being greater than or equal to two, otherwise:
        waiting to activate a pre-charging apparatus of the DC circuit;
    activating the pre-charging apparatus upon the voltage on the busbar not rising; and
    deactivating the pre-charging apparatus and jumping to the determining whether there is a fault; otherwise:
        waiting to close the electrical switch;
        closing the electrical switch;
        activating a control unit for a switch-on transient; and
    jumping to the determining whether there is a fault.
13. The method for automatically closing a DC circuit of claim 12, wherein the waiting to activate the pre-charging apparatus includes waiting for a period of time or terminating the waiting based upon a command from a communication unit.
14. The method for automatically closing a DC circuit of claim 12, wherein the waiting to close the electrical switch includes a fixed period of time or is terminated when a threshold voltage is reached on the busbar.
15. The apparatus of claim 1, wherein the pre-charging apparatus is configured to restore the voltage on the busbar after receiving a command.
16. The apparatus of claim 1, wherein the pre-charging apparatus is configured to receive a deactivation command upon the voltage on the busbar not rising, indicating a fault which still exists.
17. An electrical network comprising:
    feed-in devices;
    loads; and
    a distribution network including a busbar, wherein the feed-in devices are connected to the loads via the distribution network, the distribution network including a plurality of apparatuses as claimed in claim 2.
18. An electrical network comprising:
    feed-in devices;
    loads; and
    a distribution network including a busbar, wherein the feed-in devices are connected to the loads via the distribution network, the distribution network including a plurality of apparatuses as claimed in claim 3.
19. The method for automatically closing a DC circuit of claim 13, wherein the waiting to close the electrical switch includes a fixed period of time or is terminated when a threshold voltage is reached on the busbar.
20. An apparatus for opening or closing a DC circuit including at least one busbar, the apparatus comprising:
    an electrical switch to open or close the DC circuit;
    a fault current detection device to detect existence of a fault current;
    a tripping unit; and
    a pre-charging apparatus,
        wherein, upon the fault current being detected by the fault current detection device, the electrical switch is configured to open the DC circuit via the tripping unit and the pre-charging apparatus is configured to restore voltage on the at least one busbar before the electrical switch is closed, and wherein the pre-charging apparatus is configured to restore the voltage on the busbar after expiration of a first waiting time; and a control unit to automatically close the electrical switch after the restoration of the voltage on the at least one busbar, wherein the control unit to automatically close the electrical switch is configured to automatically close the switch after a second waiting time.

\* \* \* \* \*